US011769152B2

(12) United States Patent
Kumar

(10) Patent No.: US 11,769,152 B2
(45) Date of Patent: Sep. 26, 2023

(54) VERIFYING USER IDENTITIES DURING TRANSACTIONS USING IDENTIFICATION TOKENS THAT INCLUDE USER FACE DATA

(71) Applicant: MASTERCARD INTERNATIONAL INCORPORATED, Purchase, NY (US)

(72) Inventor: Rakesh Kumar, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 398 days.

(21) Appl. No.: 16/864,678

(22) Filed: May 1, 2020

(65) Prior Publication Data

US 2021/0342850 A1 Nov. 4, 2021

(51) Int. Cl.
*G06Q 20/40* (2012.01)
*G06Q 20/38* (2012.01)
*G06Q 20/36* (2012.01)

(52) U.S. Cl.
CPC ... *G06Q 20/40145* (2013.01); *G06Q 20/3674* (2013.01); *G06Q 20/3821* (2013.01)

(58) Field of Classification Search
None
See application file for complete search history.

(56) References Cited

U.S. PATENT DOCUMENTS

| 2013/0212655 | A1 | 8/2013 | Hoyos et al. |
| 2015/0033305 | A1* | 1/2015 | Shear .................. G06F 21/6218 726/11 |
| 2016/0086184 | A1* | 3/2016 | Carpenter ............ G06Q 20/322 705/44 |
| 2016/0224983 | A1* | 8/2016 | Cash .................. H04L 63/0807 |

(Continued)

FOREIGN PATENT DOCUMENTS

WO 2019092046 A1 5/2019

OTHER PUBLICATIONS

Barach, Chev, "International Search Report and Written Opinion of the International Searching Authority", International Application No. PCT/US2021/029103, dated Aug. 16, 2021, 9 pages.

(Continued)

*Primary Examiner* — Chrystina E Zelaskiewicz
(74) *Attorney, Agent, or Firm* — Barta, Jones & Foley, PLLC

(57) ABSTRACT

The disclosure herein describes enabling authentication of a user's identity based on a user identification (ID) token. An enrollment request is received by an identity platform from a computing device of the user. The enrollment request includes face data and payment account data associated with a payment account of the user. A face identification template of the user is generated based on the face data. Based on verifying the user's identity using data in the enrollment request, an ID token is generated including the face identification template and the payment account data. The ID token is then provided to the computing device of the user, wherein the computing device is enabled to verify the user's identity based on comparison of the captured image data of the face of the user to the face identification template of the ID token during transactions associated with the computing device.

20 Claims, 10 Drawing Sheets

(56) References Cited

U.S. PATENT DOCUMENTS

| | | | |
|---|---|---|---|
| 2017/0148014 A1* | 5/2017 | Bouse | G06Q 20/40145 |
| 2019/0089702 A1* | 3/2019 | Bhatt | H04L 63/0884 |
| 2019/0173852 A1* | 6/2019 | Chavarria | G06Q 20/00 |

OTHER PUBLICATIONS

Tang, Xiaofan, "International Preliminary Report on Patentability" International Application No. PCT/US2021/029103, dated Nov. 10, 2022, 6 pages.

* cited by examiner

VERIFYING USER IDENTITIES DURING TRANSACTIONS USING IDENTIFICATION TOKENS THAT INCLUDE USER FACE DATA

BACKGROUND

In the modern electronic payment landscape, users may make purchases from many different merchants and those users must provide identity information to each of those merchants when initiating payments. As a result, users must manage online identities for each of the merchants they frequent, which may include usernames and passwords, shipping addresses, and payment account information that they may be required to provide and manage for each merchant. The processes around maintaining identity information across many different merchants are tedious and time-consuming for users and may also result in loss of some sales for the merchants, as entering their information yet again may result in some customers giving up before completing transactions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for enabling authentication of a user's identity based on a user identification (ID) token is described. An enrollment request is received by an identity platform from a computing device of the user. The enrollment request includes face image data, face liveness data, and payment account data associated with a payment account of the user. A face identification template of the user is generated based on the face image data and the face liveness data. Based on verifying the user's identity using data in the enrollment request, an ID token is generated including the face identification template and the payment account data, such that the payment account is linked with the face identification template. The ID token is then provided to the computing device of the user, wherein the computing device is enabled to verify the user's identity based on comparison of the captured image data of the face of the user to the face identification template of the ID token during transactions associated with the computing device.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 10, the systems are illustrated as schematic drawings. The drawings may not be to scale.

DETAILED DESCRIPTION

Figure 1:
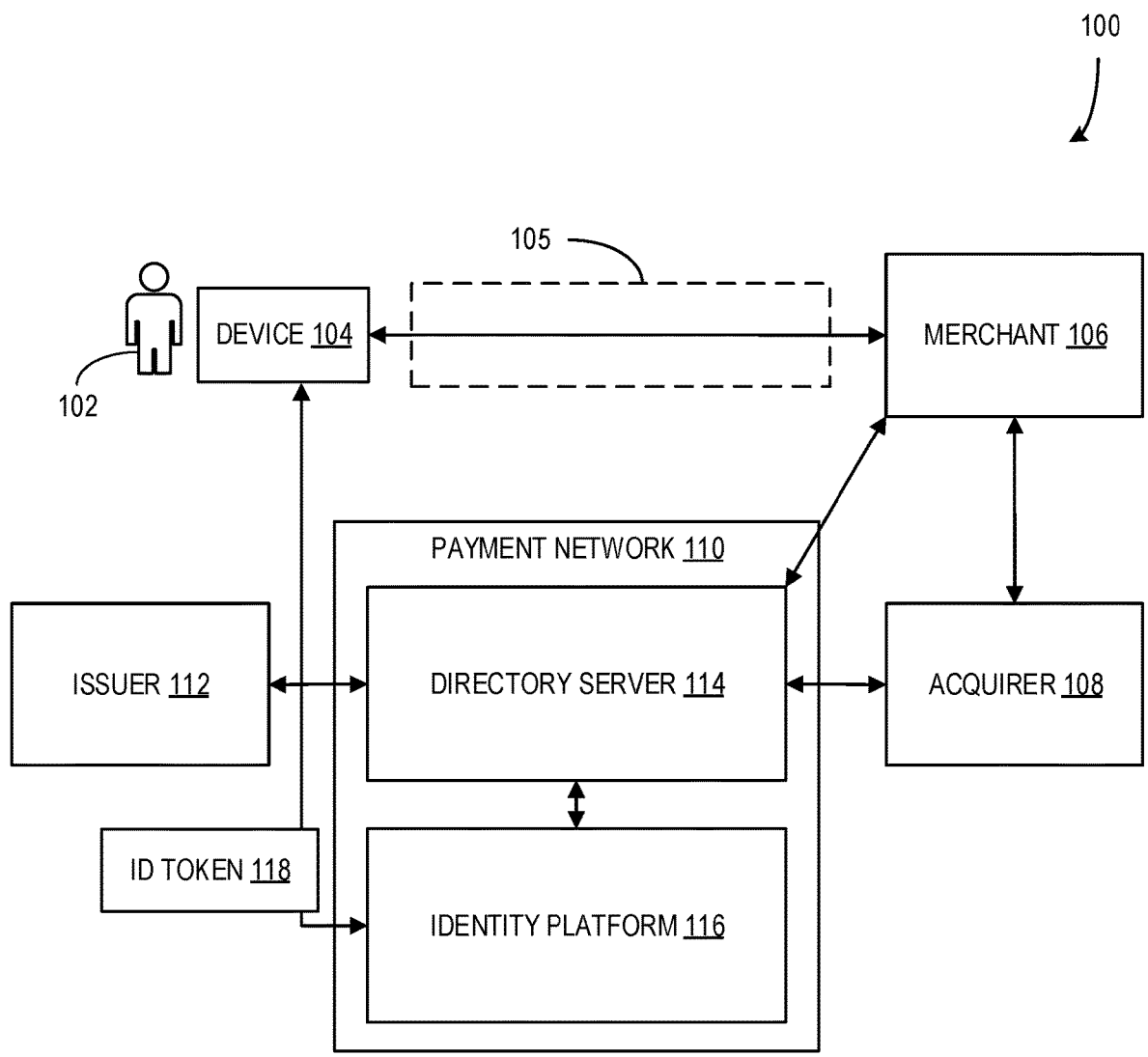
FIG. 1 is a block diagram illustrating a system configured for generating and using an identification (ID) token according to an embodiment.

Aspects of the disclosure provide a computerized method and system for enabling authentication of a user's identity based on a user identification (ID) token. An enrollment request is received by an identity platform from a computing device of the user. The enrollment request includes face image data, face liveness data, and payment account data associated with a payment account of the user. It may also include other user data, such as user contact data. A face identification template of the user is generated based on the face image data and the face liveness data. The user's identity is further verified based on the data of the enrollment request and an ID token is generated including the face identification template and the payment account data, such that the payment account is linked with the face identification template. The ID token is then provided to the computing device of the user, wherein the computing device is enabled to verify the user's identity based on comparison of the captured image data of the face of the user to the face identification template of the ID token during transactions associated with the computing device.

The disclosure addresses the challenges for customers and other users who must repeatedly enter and personal data and/or payment account data to make electronic purchases and manage their identities in association with multiple merchants or other entities to which they make payments. Further, the disclosure addresses the challenges for merchants and other entities to present customers an efficient interface through which the customers can initiate transactions using established personal and payment account information. The disclosure operates in an unconventional way in that it enables users to link their payment account information with their personal information and a face identification template associated with their face, such that the user's face biometrics may be used to verify the user's identity during authentication processes. Further, the described identity platform is configured to perform user identity verification during enrollment based on established policies, such that the identity platform can operate as a trusted entity to confirm the verification of the user's identity when the generated ID tokens are used during transactions. Once a user has enrolled and established one or more ID tokens for use on their computing device or devices, the user's process to verify the their identity is streamlined and the associated human-machine interface is improved, such that the user must only select an ID token and provide face data by capturing a "selfie" with their device. Further, the ID tokens that are established may be used with a variety of different merchants or other entities, such that the user need not re-enter their information for each merchant or transaction. Additionally, the use of the identity platform to perform the user identity verification process during enrollment may reduce or eliminate the need to perform similar processes by the merchants with which customers use ID tokens, such that merchants use fewer computing resources (e.g., processing resources, memory resources, network bandwidth, etc.) associated with the authentication of customer identities and the identity platform takes advantage of the initial user identity verification during enrollment to reduce the use of computing resources on user authentication processes by relying on the generated ID tokens.

FIG. 1 is a block diagram illustrating a system 100 configured for generating and using an ID token 118 according to an embodiment. The system 100 includes a user 102 that uses a device 104 to interact with other components of the system 100. The device 104 is configured to communicate and/or interact with a merchant 106 via a network connection configured to be secured by a security protocol 105 (e.g., EMV 3-D Secure (3DS)). The system 100 further includes an acquirer 108, a payment network 110, and an issuer 112 which are configured to communicate and/or interact in order to facilitate the processing of transactions that are initiated by the user 102 using the device 104 (e.g., such as Card-Not-Present (CNP) transactions). In some examples, the system 100 is configured to enable the user 102 to initiate a transaction with the merchant 106 using the device 104 and the system 100 processes the initiated transaction between an account of the user associated with the issuer 112 and an account of the merchant 106 associated with the acquirer 108. It should be understood that the system 100 may be configured to process such transactions in any manner without departing from the description herein.

Further, the device 104 is configured to collect user data of the user 102, including face image data and/or face liveness data (e.g.,), for use in authenticating the user's identity as part of processing transactions. For instance, face image data may include image data of the user's face captured by a camera or other optical device of the device 104 that indicates or otherwise describes structures or aspects of the user's face, such as distances between and/or relative locations of eyes, nose, and/or mouth features. Face liveness data may include image data or other data captured by the device 104 that can be used to determine that the source of the captured data is a physically present, live human being, rather than an inanimate object, photograph, or the like, such as data indicating detected motion of a user's face (e.g., blinking, eye movement, or other facial muscle movement) or data indicating how light reflects from the surfaces of a user's face (e.g., reflected light patterns indicating a three-dimensional face rather than a photo or screen displaying a face).

In some examples, the device 104 is configured to capture such data during an initial enrollment interaction (e.g., a non-transaction-based interaction specifically for enrolling the user 102 to use the captured data for identity authentication) and/or during an initial transaction-based interaction (e.g., during an identity authentication process that is part of an initiated transaction with the merchant 106). The transfer of the user's data may be via the merchant 106 to the directory server 114 and/or the identity platform 116 of the payment network 110, where it is then processed to create an ID token 118 for future use in authenticating the identity of the user 102 with the device 104 as described herein. Alternatively, or additionally, the device 104 may transfer the user's face image data and/or face liveness data to the identity platform 116 of the payment network 110 directly to enroll in the described authentication service and obtain an ID token 118 for use with the merchant 106 and/or other merchants when initiating transactions therewith.

The directory server 114 of the payment network 110 includes hardware, firmware, and/or software configured for handling authentication requests and responses between the merchant 106, acquirer 108, and issuer 112, as well as interacting with the identity platform 116 to process ID tokens, such as ID token 118 of the user 102, as described herein. In some examples, the directory server 114 is configured to be compliant with the security protocol 105 being used to transfer user authentication information between the device 104 and merchant 106. The directory server 114 may further be configured to communicate with the issuer 112 regarding authentication requests from the merchant 106 and/or acquirer 108 and to respond to the merchant 106 based on authentication responses received from the issuer 112. It should be understood that the directory server 114 may be configured to facilitate authentication of the user 102 with respect to a transaction or other interaction with the merchant 106 in any manner without departing from the description herein.

Further, the directory server 114 is configured to interact with the identity platform 116 to generate and transfer ID token 118 as described herein. In some examples, the directory server 114 invokes the identity platform 116 based on receiving a request that the user 102 wants to enroll in the provided token service and use an ID token 118 for authentication on future transactions or other interactions. The request may be received from the merchant 106 after the user initiates the enrollment with the merchant 106 or directly from the user's device 104. Once an ID token 118 is generated by the identity platform 116, the directory server 114 may receive the ID token 118 from the identity platform 116 and transfer it to the merchant 106, who may then transfer it to the user's device 104 for use by the user. The directory server 114 may further be configured to receive an authentication response from the issuer 112 in association with the user's enrollment request and, if the authentication response indicates that the user's identity is authenticated, the directory server 114 may use that authentication by the issuer 112 to validate the generated ID token 118 with the merchant 106 and/or acquirer 108. The process of generating and processing the ID token 118 is described in greater detail below with respect to at least FIGS. 2-4.

Figure 2:
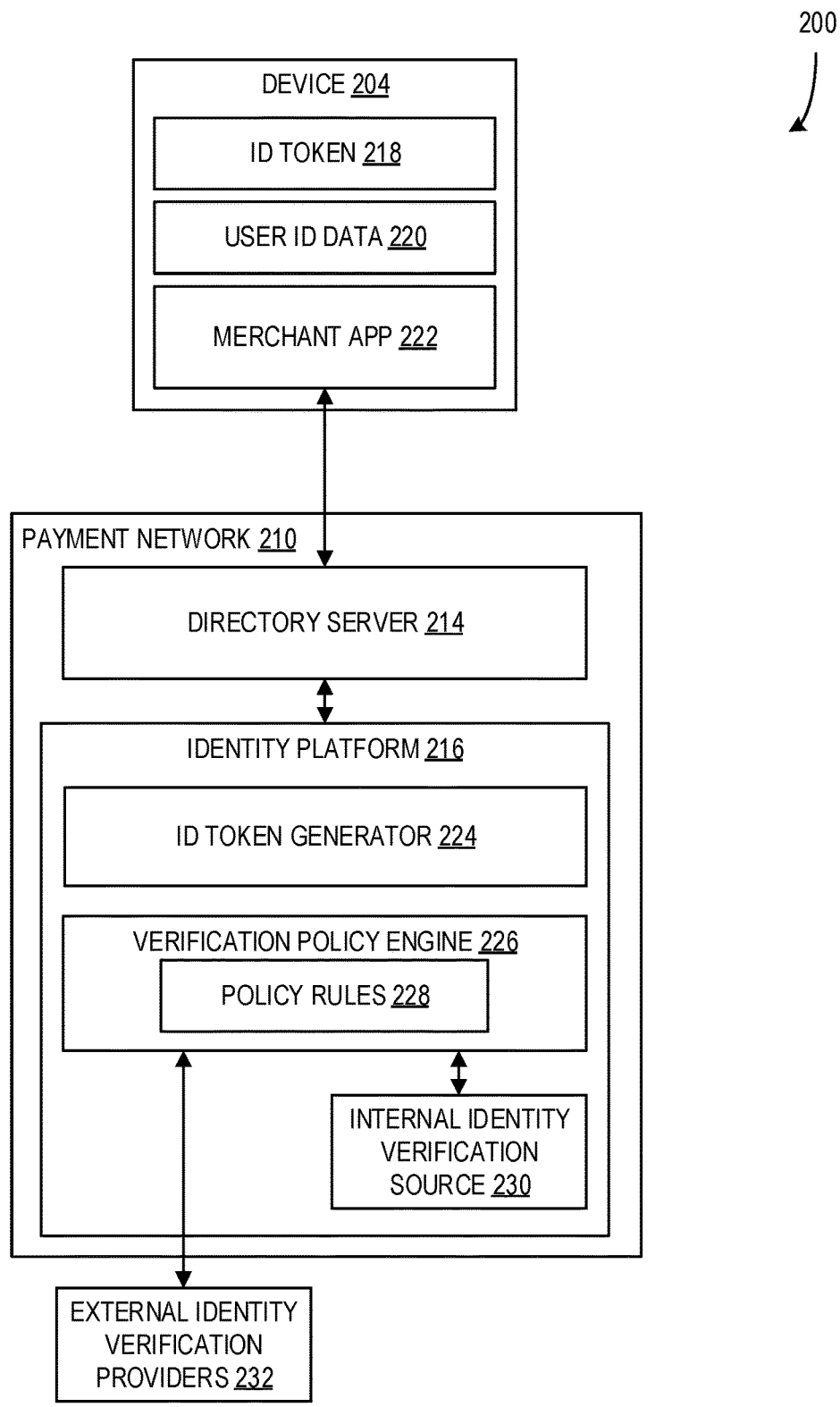
FIG. 2 is a block diagram illustrating a system configured for generating and using an ID token based on verification policy rules according to an embodiment.

FIG. 2 is a block diagram illustrating a system 200 configured for generating and using an ID token 218 based on verification policy rules 228 according to an embodiment. In some examples, the illustrated components of system 200 are part of a system, such as system 100 of FIG. 1, that is configured to enable the processing of transactions between users and merchants using the payment network 210 as described herein. The system 200 includes a device 204 and a payment network 210 which are configured to communicate and interact in order to provide an ID token 218 to the device for use in authenticating the identity of a user during transactions using the device 204. While the device 204 is shown to be in direct communication with the directory server 214 of the payment network 210 via a merchant application or app 222, it should be understood that, in some examples, the communication from the merchant app 222 to the directory server 214 may be routed through the merchant associated with the merchant app 222, such as merchant 106 of FIG. 1.

The device 204 is configured to send user ID data 220 to the directory server 214 via the merchant app 222 in order to enroll in the ID token service and make use of an ID token 218. The sent user ID data 220 includes face image data and/or face liveness data of the user, as described above. Further, in some examples, the user ID data 220 includes other identification data of the user, such as the user's name, age, birth date, address, phone numbers, email addresses, identification numbers such as driver's license numbers or passport numbers, or the like. Such additional information may be used by the identity platform 216 to validate the user's identity during the enrollment process and/or during the authentication process when using the generated ID token 218.

The directory server 214 is configured to invoke the identity platform 216 and provide the user ID data 220 for use in generating an ID token 218 therefrom. The identity platform 216 includes an ID token generator 224 that is configured to convert the user ID data 220 to a defined ID token format and a verification policy engine 226 that is configured to apply verification policy rules 228 to the user ID data 220 and/or any associated transaction data to verify the user's identity and provide verification results for use by the identity platform 216. In some examples, the policy rules 228 define how the verification of the user ID data 220 is performed, including verifying the data internally based on one or more internal identity verification sources 230 and/or routing verification requests to external identity verification providers 232 (e.g., services that specialize in verification of certain types of identification information, such as driver's license number verification).

In some examples, the policy rules 228 include rules that are configured to route verification of some user ID data 220 to the external identity verification providers 232. For instance, if the user ID data 220 includes image data of a user's passport, one or more of the policy rules 228 may be configured to identify that the image is of a passport and, based on that identification, route a verification request of the image to an external identity verification provider 232 that is known to be able to verify passports. Such policy rules 228 may include rules for identifying types of user ID data 220 (e.g., based on patterns in the data, such as patterns specific to phone numbers or addresses) and mapping data that includes generic types of users ID data that are associated with links or other information indicating how to request verification of each type of user ID data from known, trusted external identity verification providers 232 (e.g., one subset of rules identifies when a phone number is present in the user ID data 220 and, if a phone number is identified, another rule or rules cause a request including the identified phone number to be sent to an identity verification provider 232 that verifies phone numbers).

Additionally, or alternatively, the policy rules 228 may include rules configured to indicate required levels of verification based on aspects of an associated transaction or projected transactions for which the ID token may be used. For instance, the policy rules 228, when applied, may determine that, for transactions that are less than $10, it is not worthwhile to make use of external identity verification providers 232 and, instead, the user's identity is verified using the internal identity verification source 230 and some subset of the provided user ID data 220. Some verification services provided by the providers 232 may be more expensive than others and, as a result, their use may be reserved for user identity verification during large transactions, when the potential cost of fraud is much greater. For instance, for very small transactions, the verification of the user's name and address against internal records may be sufficient, while for substantially larger transactions, the user may be required to provide additional user ID data 220 (e.g., in the form of a "step up" prompt to the user), such as a captured image of the user's driver's license, passport, or other identification document, which may be verified through external providers by accessing external databases, such as databases associated with the Department of Motor Vehicles in the user's state. In some other examples, other aspects of a transaction may affect how much user ID data is required for verification. For instance, if the location of the transaction is substantially different than other recent transactions, a greater degree of verification of the user's identity may be required by the policy rules 228 in order to proceed to generating an associated ID token 218.

When the verification policy engine 226 verifies the user's identity during enrollment of the user into the ID token service, the ID token generator 224 is configured to use the user ID data 220, including face image data and/or face liveness data, to generate an ID token 218. The face image data and face liveness data may be used to generate a face identification template. The face identification template is configured to include one or more patterns of the user's face and/or liveness data that can be used to validate the user's identity in the future based on captured face image and liveness data to a defined degree of confidence. The face identification template is included as part of the generated ID token 218, such that it can be used by the device 204 and/or the identity platform 216 for authenticating the user's identity in future transactions, as described herein. In some examples, the face identification template may include data points that indicate relative locations and/or distances between certain parts or portions of the user's face, such as the relative locations of the user's eyes, nose, and/or mouth. In other examples, other types of facial recognition patterns and/or techniques may be used to generate and use the face identification template to validate the user's identity without departing from the description herein.

In addition to the face identification template, the ID token generator 224 is configured to include payment account information with the ID token in cases where the ID token is associated with a particular payment account (e.g., a credit card number associated with the user's credit account). Additionally, other data may be included in the ID token that may be of use in authenticating the user's identity during transactions without departing from the description herein. The data of the ID token may further be encrypted to secure the data when not being used for authentication. For instance, the ID token may be encrypted using some or all of the of the data of the user's face identification template, such that decryption of the ID token requires the user to provide face image data and/or face liveness data that matches the face identification template during a future transaction or other interaction. Alternatively, or additionally, the ID token may be encrypted based on other biometric data associated with the user (e.g., such as a fingerprint or thumbprint data, retina-based data, voice pattern data, or the like).

Figure 3:
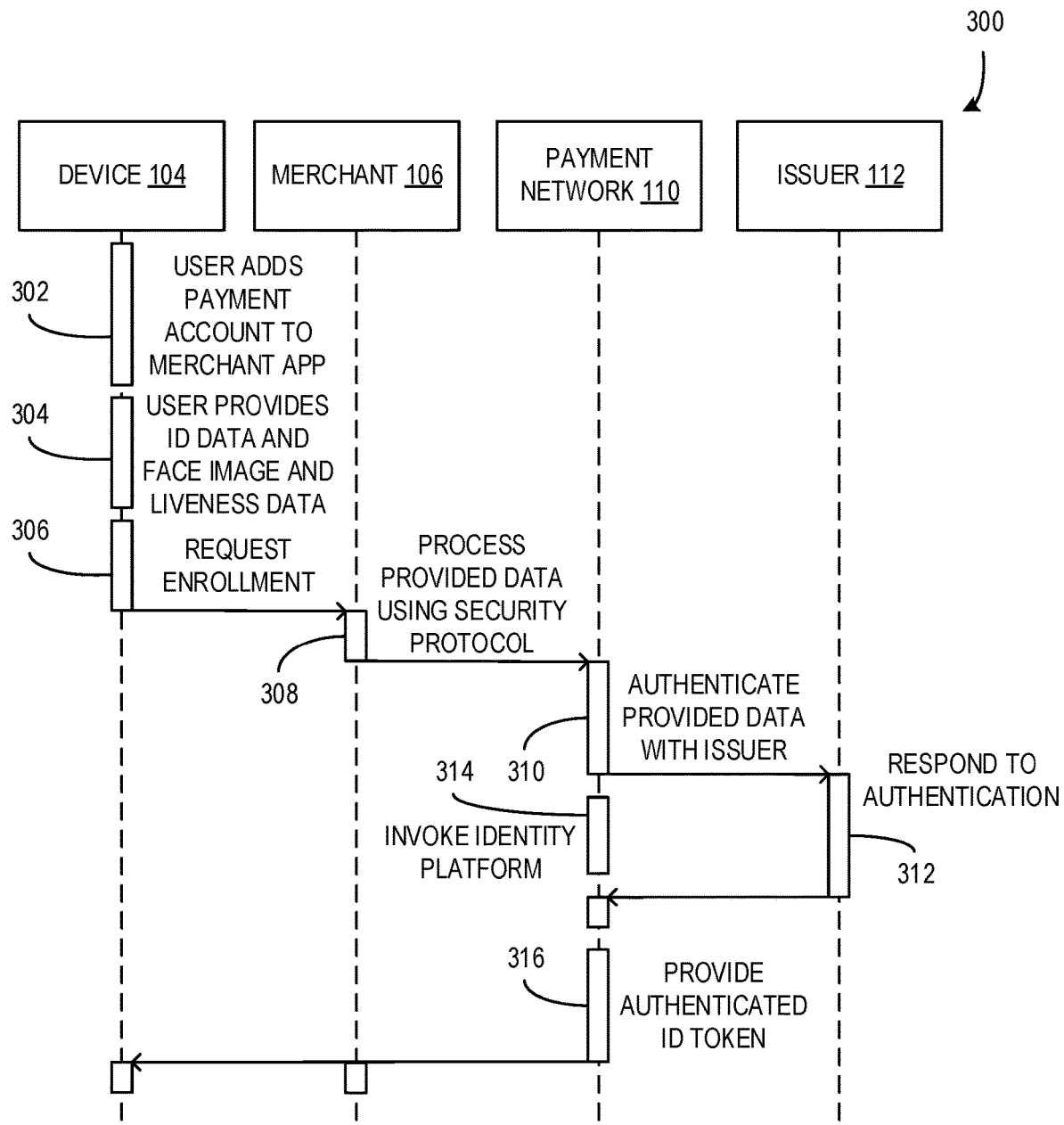
FIG. 3 is a sequence diagram illustrating a computerized process for enrolling a user in an ID token service and providing an ID token to the user's device according to an embodiment.

FIG. 3 is a sequence diagram illustrating a computerized process 300 for enrolling a user in an ID token service and providing an ID token to the user's device according to an embodiment. In some examples, the computerized process 300 is performed by one or more components of a computerized system, such as system 100 of FIG. 1 described herein. At 302, a user adds a payment account (e.g., a bank account or credit card account) to a merchant app associated with a merchant 106 on a device 104. Adding the payment account to the merchant app may cause the merchant app to be configured to enable the user to use the payment account to make payments to the merchant 106. In some examples, adding the payment account includes providing an account number or other account identifier (e.g., a credit card number) and/or other account data to the merchant 106 via the merchant app to enable the user to initiate transactions with the payment account using the merchant app on the device 104. For instance, when adding payment account to a merchant app, a user may provide a credit card number, an expiration date of the credit card, a name associated with the credit card account, an address, zip code, or other region information associated with the credit card account, and/or any additional information associated with the credit card account that may be necessary to initiate transactions therewith.

At 304, the user provides ID data (e.g., user ID data 220), face image data, and face liveness data to the device 104 and/or the merchant app thereon for use in enrolling the user and the associated payment account in the ID token service provided by the payment network 110 as described herein. The user ID data provided may be in the form of the user's identifying information, such as name, phone number, address, or other information. Alternatively, or additionally, it may include information that may be verifiable through verification providers, such as a driver's license number, passport information, or other official and/or government document information that may be used to verify the user's identity.

In some examples, the face image data and face liveness data are captured by a camera or other optical device of the device 104 and provided by the device 104 to the merchant app or other application associated with the ID token service described herein. The face image data may be in the form of an image or photo captured by the camera while the face liveness data may be in the form of captured video data of the user's face over a period of time. Additionally, or alternatively, the face image data may include one or more frames of the captured video data that include an image of the user's face. The face liveness data may include data associated with inadvertent or unintentional movement of the user's face during the captured video and/or data associated with patterns of light reflected from some or all surfaces of the user's face during the captured video. Alternatively, or additionally, the device 104 may be configured to prompt the user to make one or more motions during the captured video (e.g., blinking eyes, nodding the head or turning the head side to side, opening and/or closing the mouth, etc.), such that video data associated with the prompted motions is included in the face liveness data.

At 306, the user requests enrollment into the ID token service via the device 104 by sending the data provided to the merchant app to the merchant 106. The enrollment request sent to the merchant 106 includes the payment account data, user ID data, and/or the face image and liveness data. The sent enrollment request is processed using a security protocol by the merchant 106 at 308 and/or an application of the device 104 associated with the security protocol (e.g., the EMV 3DS protocol may be used to secure communications between the device 104 and merchant 106 and/or between the merchant 106 and the payment network 110).

At 310, the payment network authenticates the provided data with the issuer 112 that manages or is otherwise associated with the user's payment account. In some examples, authenticating the provided data includes authenticating the payment account data and some or all of the user ID data with the issuer 112 in a similar manner as the authentication process associated with processing a payment transaction between the user's device 104 and the merchant 106. The issuer 112 responds to the authentication request of the payment network 110 at 312. This authentication response indicates whether the user and associated payment account information is authenticated by the issuer 112 or not. If the user and/or associated payment account are not authenticated by the issuer 112 at 312, the process ends without completing the enrollment of the user in the ID token service, as the ID token service relies on the provided enrollment information being authenticated by the issuer 112 in order for any associated ID tokens to be trusted during future transactions.

In addition to the payment network 110 requesting authentication of the provided information from the issuer 112 at 310, the payment network 110 is also configured to invoke an identity platform as described herein at 314. The identity platform is configured to generate an ID token based on the data provided by the user, including the payment account data, user ID data, and/or face image and liveness data. This process is described in greater detail below with respect to FIG. 4.

At 316, after the issuer 112 has authenticated the user and associated payment account and the identity platform has been invoked, the payment network 110 provides an authenticated ID token to the user's device 104 and/or to the merchant 106. The authenticated ID token may then be used by the user during transactions with the merchant 106 using the associated payment account to quickly and easily complete any required authentication of the user's identity.

Figure 4:
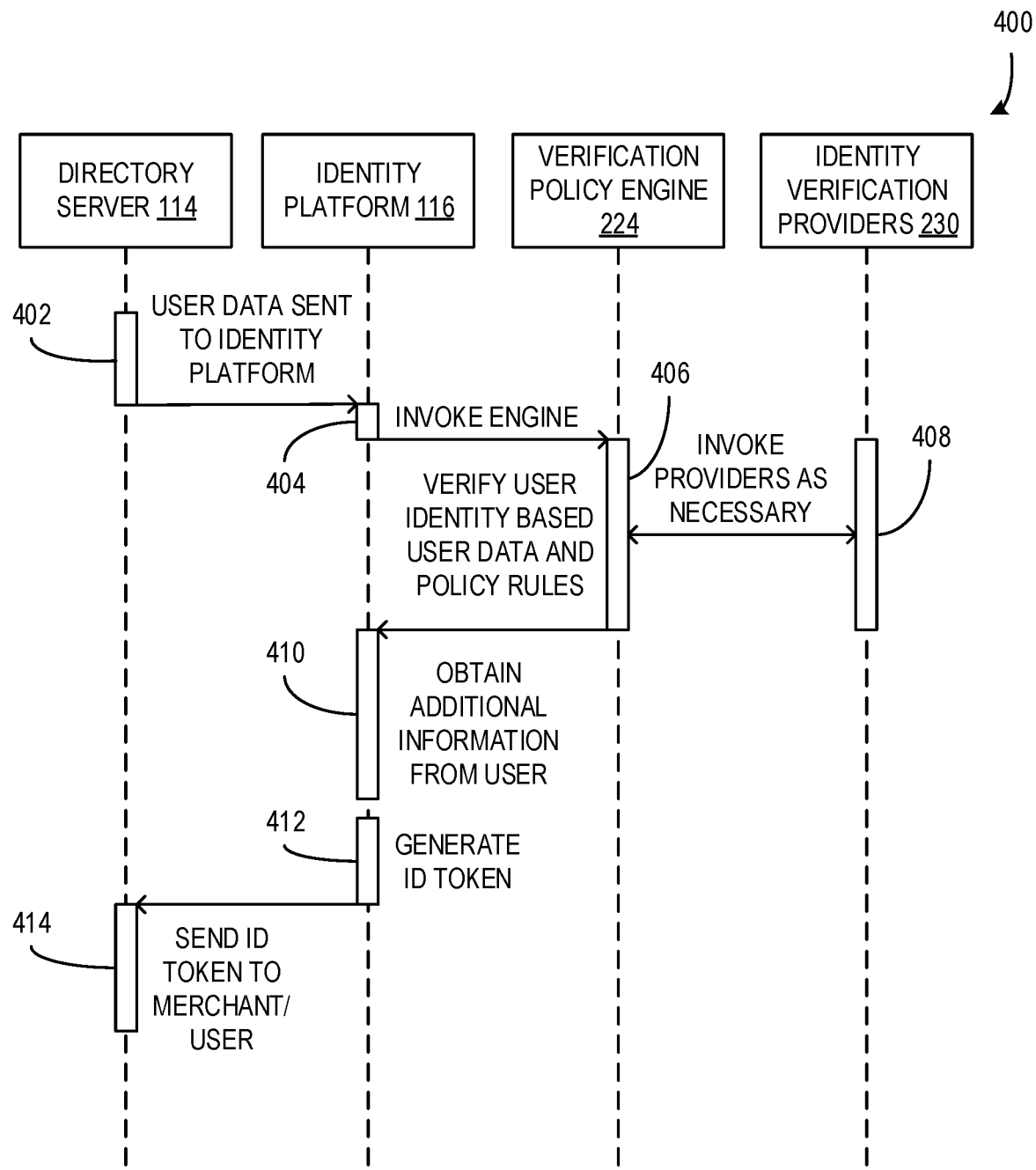
FIG. 4 is a sequence diagram illustrating a computerized process for generating an ID token according to an embodiment.

FIG. 4 is a sequence diagram illustrating a computerized process 400 for generating an ID token according to an embodiment. In some examples, the process 400 is performed by one or more components of a payment network (e.g., payment network 110 or 210) in a system (e.g., system 100 or 200) as described herein. Further, the process 400 may be initiated during an enrollment process, such as process 300 of FIG. 3 described above, and/or during a process associated with a transaction between a user's device (e.g., device 104) and a merchant (e.g., merchant 106). At 402, the directory server 114 of the payment network sends user data to the identity platform, invoking the identity platform (as mentioned above at 314 of FIG. 3). In some examples, the sent user data includes at least a portion of provided payment account data, user ID data, and/or face image and liveness data. Further, the data sent to the identity platform may also include data associated with a specific transaction, such as a transaction amount, a transaction type indicator, and/or other transaction-based metadata.

At 404, the identity platform 116 invokes the verification policy engine 226 and provides the policy engine 226 with some or all of the user data sent by the directory server 114. The verification policy engine 226 is configured to verify the user's identity based on the received user data and defined policy rules at 406, as describe above with respect to FIG. 2. In some examples, the verification policy engine 226 verifies the user's identity based on one or more of the provided user data points and/or values, including the user's name, the user's address, the user's phone number, current location data obtained from the user's device, and/or identification data from official or government documents, such as captured image data from the user's identification card, driver's license, passport, or the like. The applied policy rules may be configured to determine how many and which data points to verify based on the transaction amount, transaction type, or other transaction metadata value (e.g., a transaction for a small amount may require verification of fewer user data points than a transaction for a large amount).

Further, at 408, one or more of the policy rules applied by the verification policy engine 226 may be configured to invoke or otherwise communicate with identity verification providers 232, including external identity verification providers, to request verification of specific user data points or sets of user data points (e.g., sending a user's name and address to a verification provider that provides verification results using a database that includes linked name and address information).

At 410, if the user data is found to be insufficient to complete verification of the user based on the policy rules of the verification policy engine 226, the identity platform may contact the user (e.g., via communication with the user's device 104) to obtain additional information for use in the verification. The prompting may include prompting the user for specific information (e.g., asking the user to provide an image of an official identification document if they have not done so). Alternatively, or additionally, the identity platform 116 may contact the user to obtain additional face image data and/or face liveness data (e.g., if the provided face image data and/or face liveness data is found to be unclear or otherwise insufficient to form an accurate template). After any additional information is obtained from the user, the identity platform 116 may be configured to invoke the verification policy engine 226 to apply policy rules of the engine 226 to the newly obtained information from the user.

Once the user's identity is verified by the verification policy engine 226 and any additional information has been obtained from the user, the identity platform 412 generates an ID token for the user based on the provided payment account data, the user ID data, and the face image and liveness data. For instance, an ID token generator 224 of the identity platform 216 may generate the ID token as described above in FIG. 2. The generated ID token is then sent by the directory server 114 to the merchant and/or the user associated with the ID token. In some examples, the sending of the ID token by the directory server 114 at 414 occurs during an enrollment process enrolling the user in the ID token service, as described at 316 of FIG. 3 above.

Figure 5:
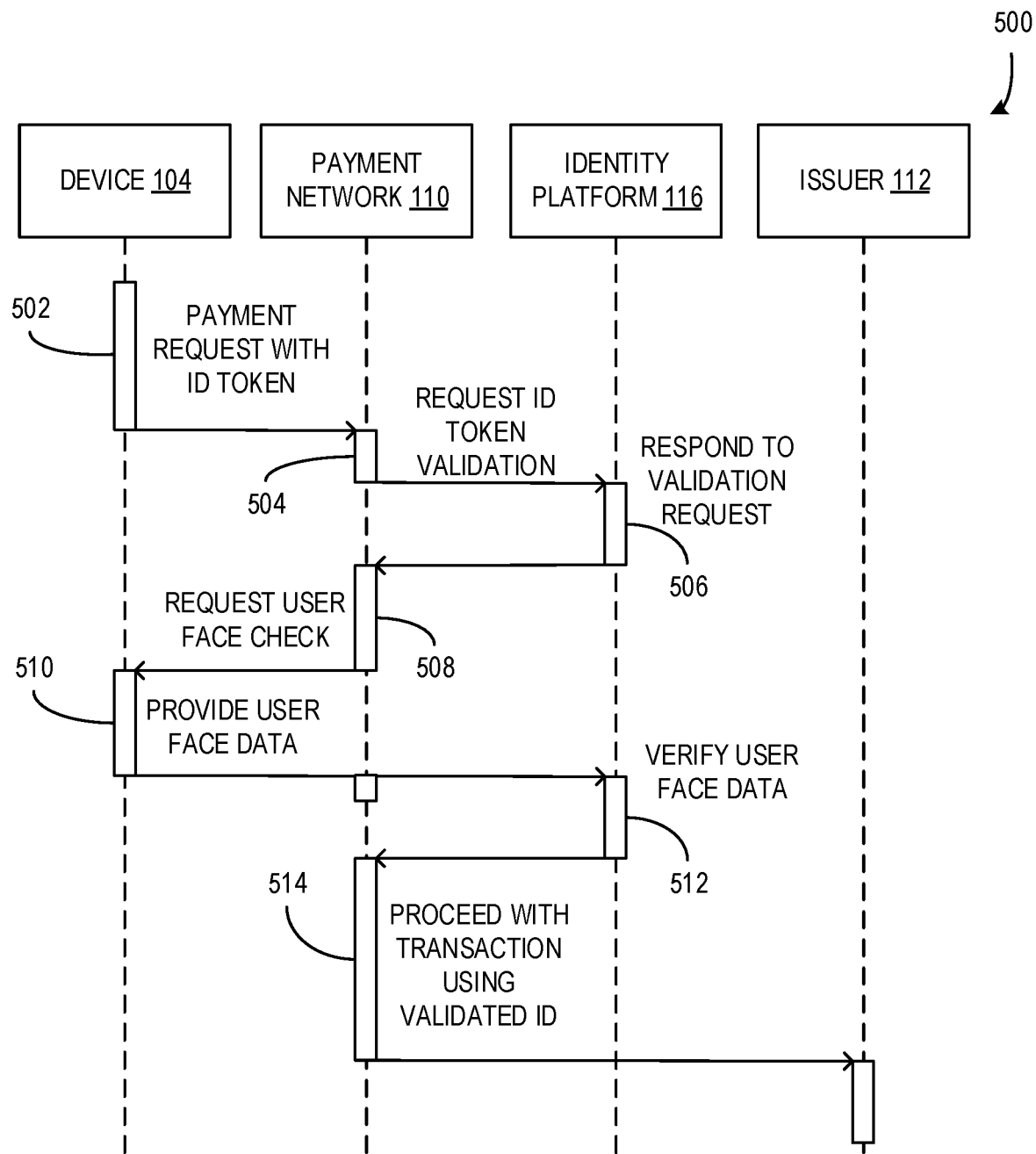
FIG. 5 is a sequence diagram illustrating a computerized process of facilitating an electronic transaction using an ID token according to an embodiment.

FIG. 5 is a sequence diagram illustrating a computerized process 500 of facilitating an electronic transaction using an ID token according to an embodiment. In some examples, the process 500 is performed by one or more components of a system, such as system 100 of FIG. 1 described above. Further, the process 500 may take place after a user has enrolled in the ID token service described herein and has an authenticated ID token on a device 104. At 502, the device 104 initiates a payment request associated with an electronic transaction including the authenticated ID token. In some examples, the payment request is sent to a merchant (e.g., merchant 106) electronically via a merchant application (e.g., merchant app 222). Further, the merchant may then send the payment request, including the ID token, to the payment network 110 for authentication and further processing of the associated electronic transaction.

At 504, the payment network 110 requests ID token validation from an associated identity platform 116. The identity platform 116 receives the ID token from the payment network 110 and responds to the validation request at 506. The response may include a request for user face image and/or liveness data to be captured by the user at the current time. Additionally, or alternatively, the identity platform 116 may be configured to perform additional validation processes on the received ID token to determine whether the ID token is invalid for other reasons prior to requesting additional face image and/or liveness data (e.g., the ID token may be improperly formatted or corrupted, indicating that it may have been tampered with and cannot be validated).

At 508, the payment network 110 sends a request for a user face check to the device 104. The request may include instructions to the device 104 to prompt the user to provide current face data and/or instructions to capture the user's face for a defined period of time (e.g., a half second, one second, or five seconds). Further, the prompt may include instructions for the user to make a motion or motions with their face and/or head while the data is being captured (e.g., "turn your head to the left and then to the right").

At 510, the device 104 captures the requested user face data, including face image data and face liveness data, and provides the captured user face data to the identity platform 116 via the payment network 110. The user face data may further include a timestamp or other data that may be used to confirm that the user face data was captured within a defined range of the request for the user face data, such that users may not provide previously captured face data in response to the request.

At 512, the identity platform 116 verifies the provided user face data based on the ID token (e.g., if the provided user face data matches the face identification template of the ID token, the identity of the user providing the user face data is verified to be the authenticated user of the ID token). In some examples, verifying the user face data includes converting the user face data into a face identification template and comparing this face identification template to the face identification template of the ID token. If the two templates match with a defined degree of confidence, the user face data is verified (e.g., if the two face identification templates match for a defined threshold value of 80% of the data points or data patterns in the templates, the user face data is verified). Additionally, or alternatively, the user face data and/or an associated face identification template may be used to decrypt some or all of the ID token when the ID token is encrypted based on the face identification template of the ID token. If the decryption of the ID token is successful (e.g., the decrypted ID token is formatted correctly and can be read), the user face data may be verified. If the decryption results in an ID token that is corrupted or otherwise not readable, then the user face data is not verified.

At 514, if the user face data is verified and the ID token is otherwise validated, the payment network 110 proceeds with the electronic transaction using the validated ID token to authenticate the identity of the user. Proceeding with the transaction may include communicating data associated with the payment request to the issuer 112 as illustrated (e.g., the payment network 110 indicates to the issuer 112 that the identity of the user has been authenticated based on an authenticated ID token). Further communications and/or interaction between parties to the electronic transaction may also be performed without departing from the description herein (e.g., further interactions with the merchant, acquirer, and/or user).

Figure 6:
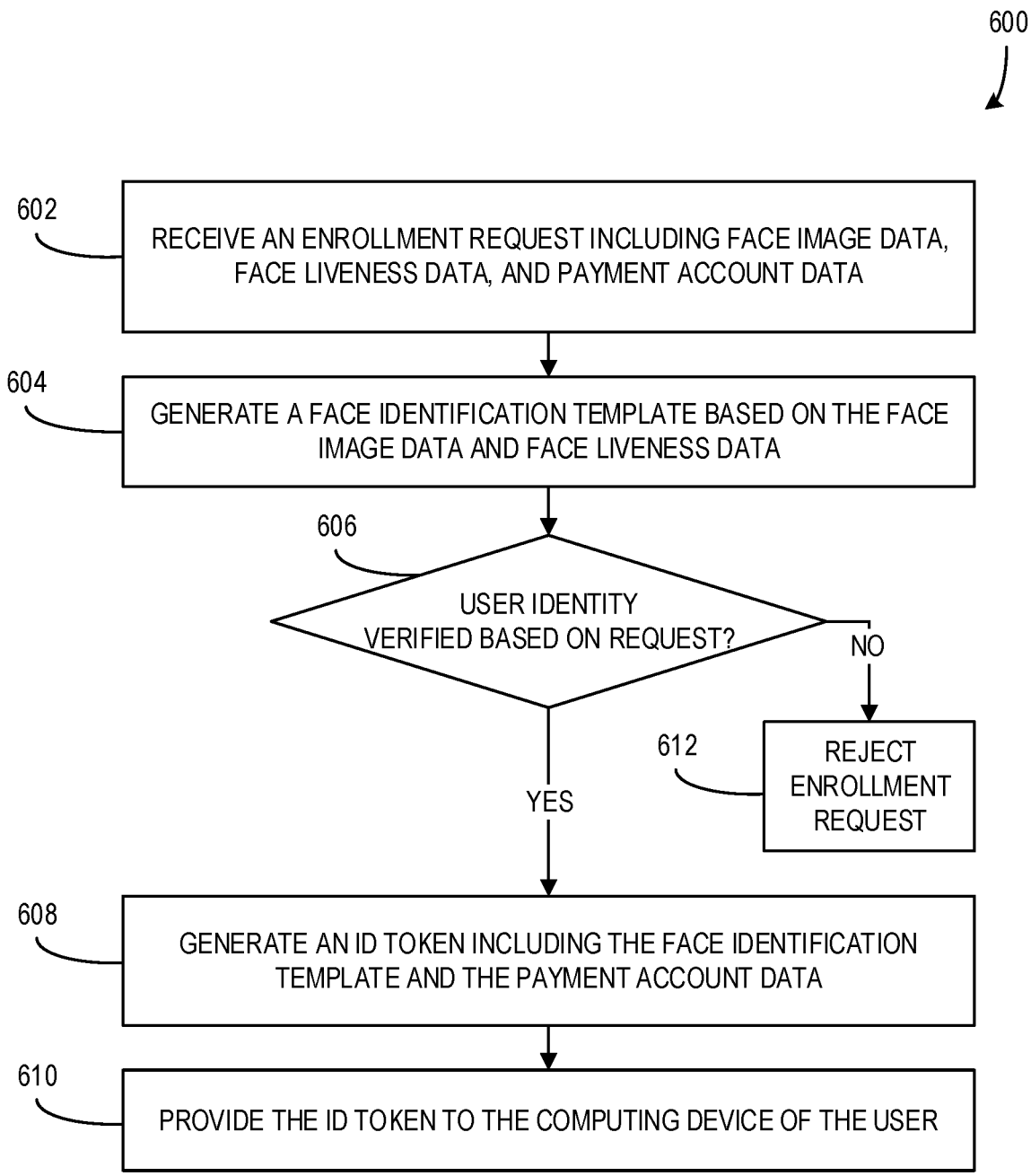
FIG. 6 is a flow chart illustrating a computerized method for enrolling in an authentication service and generating an associated ID token according to an embodiment.

FIG. 6 is a flow chart illustrating a computerized method 600 for enrolling in an authentication service and generating an associated ID token according to an embodiment. In some examples, the computerized method 600 is performed by one or more components of a system such as systems 100 and/or 200 of FIGS. 1 and 2. At 602, an enrollment request for enrolling in an authentication service is received including face image data, face liveness data, and payment account data. In further examples, the enrollment request may also include other user information, such as a first and last name, address information and/or other contact information, and/or identification information associated with identification documents such as driver's licenses, passports, or the like.

At 604, a face identification template is generated based on the face image data and the face liveness data. In some examples, the face identification template includes a pattern of data values representing structures or aspects of the user's face, as described herein (e.g., distances between and/or relative locations of facial features such as eyes, nose, and/or mouth, patterns of light reflections off of various surfaces of the user's face).

At 606, if the user's identity is verified based on the enrollment request, the process proceeds to 608. Alternatively, if the user's identity is not verified based on the enrollment request, the process proceeds to reject the enrollment request at 612 (e.g., the user may be prompted to retry the enrollment or otherwise notified of the failure of the enrollment). In some examples, the verification of the user's identity is performed by an identity platform and/or an associated verification policy engine (e.g., the identity platform 116 and verification policy engine 226). The process of verifying the user's identity may be performed as described herein with respect to FIG. 4, including using identity verification provider services with respect to some or all of user data provided in the enrollment request or in related interactions with the user.

At 608, an ID token is generated that includes the face identification template and the payment account data. In some examples, other user identification data is included in the ID token, such as the user's name, address, other contact information, and/or other identification information, as described herein. The ID token links the user data and face identification data to the payment account data, such that the ID token may be used during authentication of the user with respect to transactions involving the payment account with which the payment account data is associated.

At 610, the ID token is provided to the computing device of the user. The ID token may be provided in a response message from the authentication service in response to the enrollment request. The ID token may also be stored in a cloud data store or other distributed data store such that the user may access it from other computing devices as well. In some examples, the ID token may be stored on the user's computing device as a cookie or other similar data structure that is configured for use with a web browser application or the like.

Figure 7:
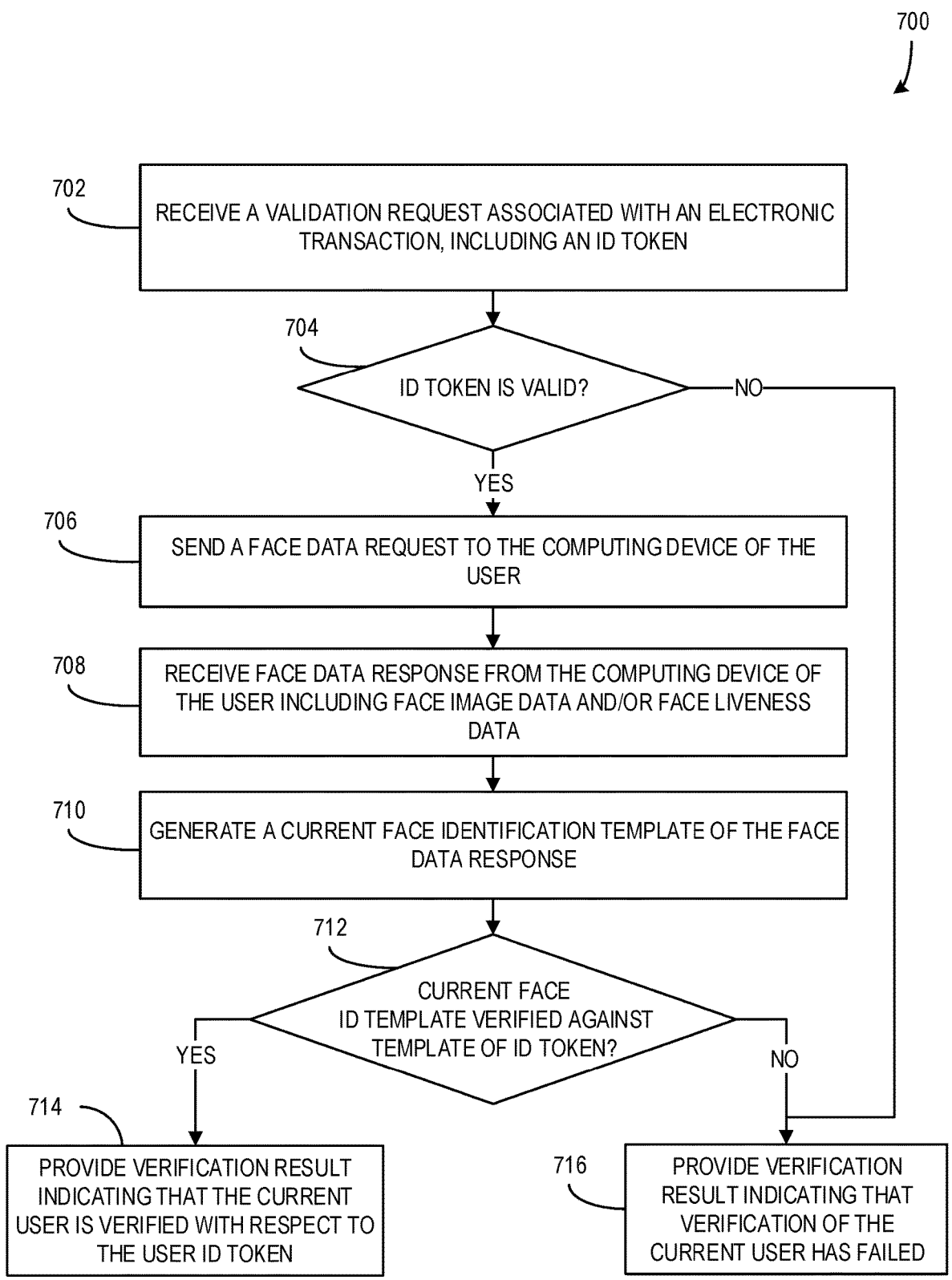
FIG. 7 is a flow chart illustrating a computerized method for verifying a user's identity during processing of an electronic transaction using an ID token according to an embodiment.

FIG. 7 is a flow chart illustrating a computerized method 700 for verifying a user's identity during processing of an electronic transaction using an ID token according to an embodiment. In some examples, the computerized method 700 is performed by one or more components of a system such as systems 100 and/or 200 of FIGS. 1 and 2. At 702, a validation request that is associated with an electronic transaction (e.g., with respect to a payment request of the transaction) is received. The validation request includes an ID token as described herein. At 704, if the ID token is valid, the process proceeds to 706. Alternatively, if the ID token is invalid, the process proceeds to 716. The validation of the ID token may include validating user information included in the ID token against known user data and/or validating payment account data against known payment account information. Further validation may include decrypting some or all of the ID token and determining whether the decrypted ID token is intact.

At 706, a face data request is sent to the computing device of the user. The face data request may be sent directly to the computing device or sent to another entity, such as a merchant server associated with the electronic transaction, to be forwarded to the computing device of the user. The face data request may cause the computing device of the user to prompt the user to take a photograph of his or her face (e.g., a "selfie") and/or record a short video of his or her face.

At 708, a face data response is received from the computing device of the user including face image data and/or face liveness data. In some examples, the face data response includes a short video recording of the user's face. The video recording may include the user's face remaining relatively still or movements of the user's face based on prompts to the user (e.g., blinking of the eyes, nodding or turning of the head).

At 710, a current face identification template is generated of the face data response. The generation of the current face identification template may be done in the same manner as the generation of a face identification template that is included in the ID token as described herein.

At 712, if the current face identification template is verified against the face identification template of the ID token, the process proceeds to 714. Alternatively, if the current face identification template is not verified against the face identification template of the ID token, the process proceeds to 716. The verification of the current face identification template against the template of the ID token may include comparison of the data patterns in each template to determine the percentage or fraction of the templates that match and/or the percentage or fraction of the templates that do not match. The determined match percentage or fraction may be compared to a defined threshold value to determine whether the current template is verified with respect to the template of the ID token (e.g., if the templates match for 70% or greater of the data points therein, the current template is verified).

At 714, when the current face ID template is verified, a verification result indicating that the current user is verified with respect to the ID token is provided. The provided verification result may be used to authenticate the user for the associated electronic transaction so that the processing of the transaction may proceed. Thus, the user can initiate and complete the electronic transaction by providing the ID token and current face image and/or liveness data as described herein.

Alternatively, if the current face identification template is not verified against the template of the ID token or if the ID token is not validated at 704, a verification result indicating that the verification of the current user has failed is provided at 716. The failed verification result may be used by the executing system to prevent completion of the electronic transaction, prompt the user to try the transaction again, and/or prompt the user to try providing face data again. Thus, the method prevents a user from completing a transaction when they are not able to provide a valid ID token and provide current face data that sufficiently matches the face identification template of the valid ID token.

Additional Example Scenarios

Aspects of the disclosure enable various additional scenarios, such as next described.

Figure 8:
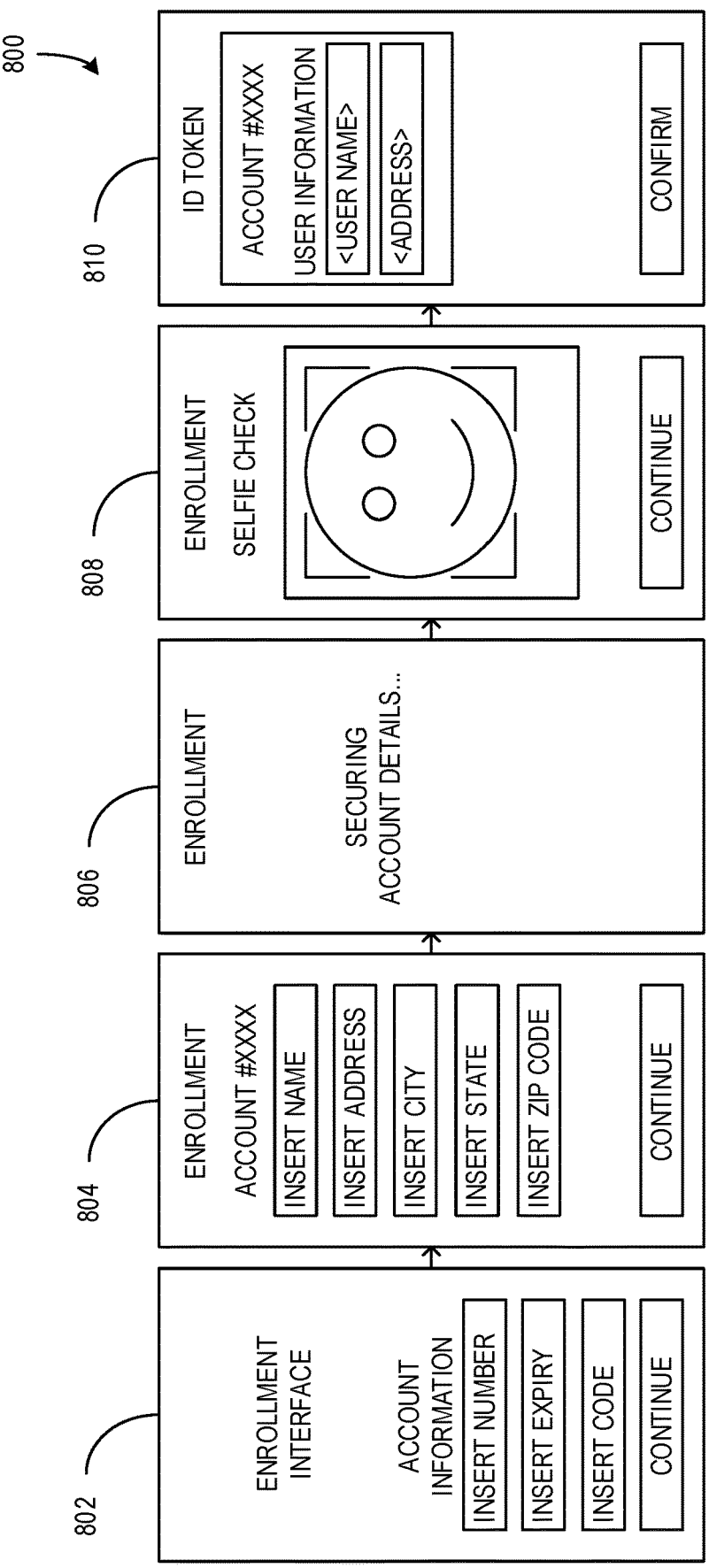
FIG. 8 is a block diagram illustrating a set of graphical user interfaces (GUIs) configured to enable a user to enroll in an authentication service according to an embodiment.

FIG. 8 is a block diagram 800 illustrating a set of graphical user interfaces (GUIs) configured to enable a user to enroll in an authentication service according to an embodiment. In GUI 802, the user of the illustrated computing device has initiated an enrollment process for enrolling in an authentication service as described herein. The GUI 802 prompts the user to provide payment account data, including an account number (e.g., a credit card number), an expiry date of the associated credit card, and a code associated with the credit card (e.g., a card verification value (CVV) that is further used in authenticating use of the card or associated payment account to make payments. The GUI 802 further includes a continue button that, when activated, causes the computing device to display the next screen as illustrated in GUI 804. In some examples, the continue button may be deactivated (e.g., not pressable or otherwise activatable) until the user has provided information for each of the prompts on the screen.

In GUI 804, the user is further prompted to provide user data, including the user's name, the user's address, the user's city, the user's state, and the user's zip code. It should be understood that, in other examples, more, fewer, or different user data values may be requested by the GUI 804 without departing from the description herein. After the requested information is provided, the user is enabled to activate the continue button again to proceed to the GUI 806. GUI 806 is a waiting screen that is displayed while the data provided is processed by entities associated with the authentication service (e.g., payment network 110, identity platform 116, and/or verification policy engine 226). Such processing may include steps as described herein, such as the steps of FIGS. 3 and 4.

After the processing of the user-provided data is complete, the GUI 808 is displayed to collect face data from the user, including face image data and/or face liveness data as described herein. The displaying of GUI 808 may further include a camera of the computing device being activated so that the user can align the camera with his or her face and take the requested photo, or "selfie". After the face data is captured, the user is enabled to activate the continue button to proceed to GUI 810.

In GUI 810, the enrollment process is complete and the ID token that was just created as a result of the enrollment process is displayed. The ID token is associated with the payment account information and the user information that was provided, including the face data, as described herein. The ID token may be used to authenticate the user when making payments with the associated payment account during future transactions. The GUI 810 further includes a "confirm" button that enables the user to confirm that the displayed token is correct. In other examples, the user may be enabled to edit or change data of the displayed ID token in case a mistake was made in the in initial process. Further, in other examples, the GUI 810 may be configured to display one or more other ID tokens that have been created as well.

Figure 9:
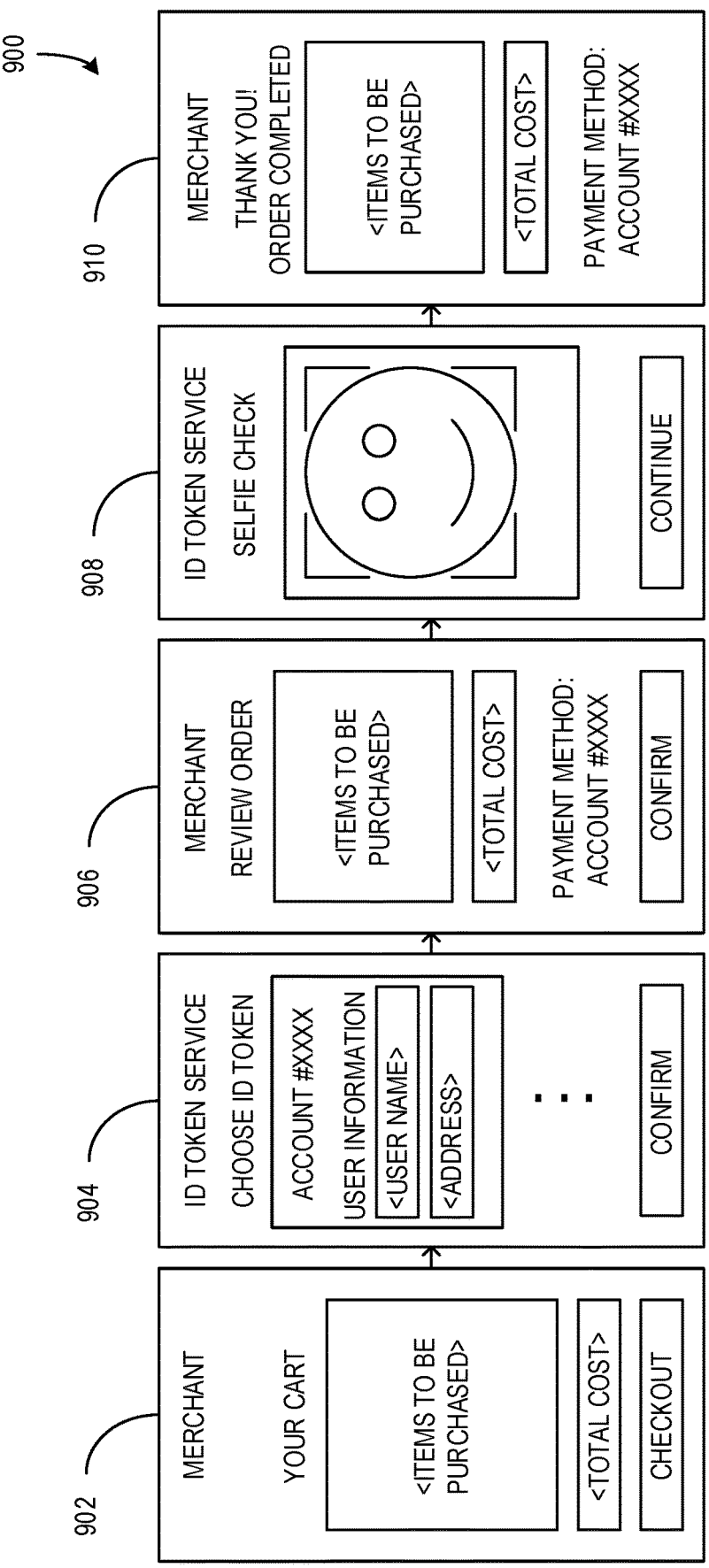
FIG. 9 is a block diagram illustrating a set of GUIs configured to enable a user to provide an ID token as payment and user authentication during an electronic transaction with a merchant according to an embodiment.

FIG. 9 is a block diagram 900 illustrating a set of GUIs configured to enable a user to provide an ID token as payment and user authentication during an electronic transaction with a merchant according to an embodiment. In GUI 902, the user has selected one or more items to be purchased via a merchant website or application. The items to be purchased are shown and an associated total cost is displayed below the list of items. The GUI 902 includes a "checkout" button that enables the user to proceed to the next GUI after confirming that the selected items to be purchased are correct.

In GUI 904, after the user has chosen to checkout from the merchant website or application, the displayed GUI switches to an interface associated with the ID token service or authentication service with which the user is enrolled. The GUI 904 displays one or more ID tokens that the user has generated and a confirm button. The user is enabled to select one of the ID tokens as a form of authentication and payment for the transaction with the merchant and confirm the selection using the confirm button as described herein.

In GUI 906, after the user has selected an ID token and associated payment account for the transaction, the GUI switches to an interface associated with the merchant that enables the user to review the order. The items to be purchased are shown along with the total cost, as well as the selected payment method in the form of the payment account. In other examples, other information may be shown, such as a shipping address or the like, without departing from the description herein. When the user confirms that the displayed information is accurate, the user is enabled to activate the confirm button to proceed to the next screen.

In GUI 908, the GUI switches to an interface associated with the ID token service that prompts the user to provide a "selfie", or face data, in order to verify the identity of the user at the time of the transaction. As with GUI 808 described above, a camera of the computing device may be activated and the user may provide face image data and/or face liveness data, which is used to verify the user's identity as described herein. After the user has provided the face data, they are enabled to continue to the next GUI by activating the continue button.

In GUI 910, the verification of the user's identity and the associated authentication of the user with respect to the transaction with the merchant are completed and the transaction is completed. The GUI 910 displays an order confirmation screen with information about the items purchased, the total cost, and the payment method used. In some examples, other information may be displayed without departing from the description herein. Further, if the verification of the user's identity fails, a different GUI notifying the user of the failure of the transaction may be displayed and the user may be prompted to retry the transaction.

Exemplary Operating Environment

Figure 10:
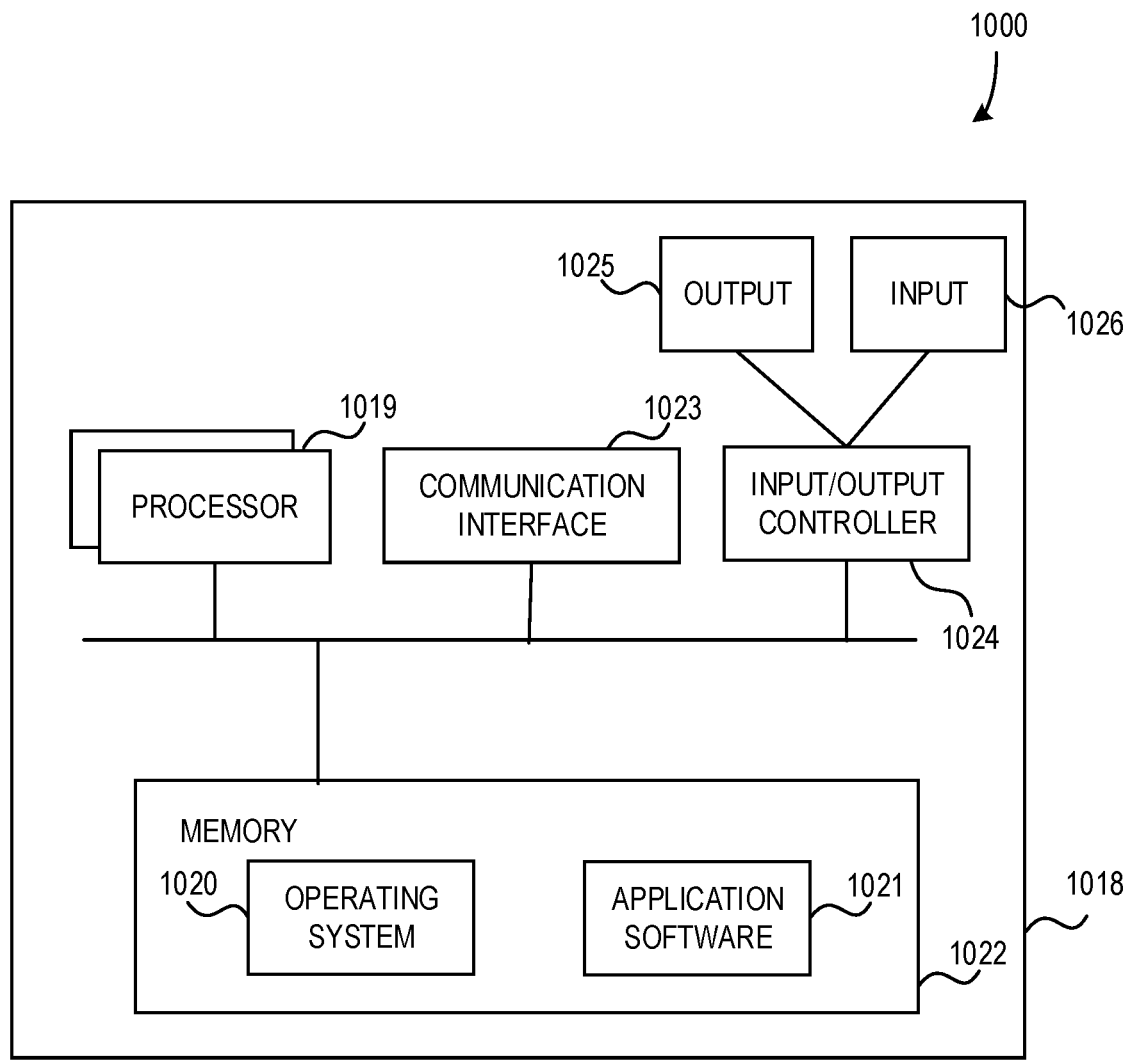
FIG. 10 illustrates a computing apparatus according to an embodiment as a functional block diagram.

The present disclosure is operable with a computing apparatus according to an embodiment as a functional block diagram 1000 in FIG. 10. In an embodiment, components of a computing apparatus 1018 may be implemented as a part of an electronic device according to one or more embodiments described in this specification. The computing apparatus 1018 comprises one or more processors 1019 which may be microprocessors, controllers or any other suitable type of processors for processing computer executable instructions to control the operation of the electronic device. Alternatively, or in addition, the processor 1019 is any technology capable of executing logic or instructions, such as a hardcoded machine. Platform software comprising an operating system 1020 or any other suitable platform software may be provided on the apparatus 1018 to enable application software 1021 to be executed on the device. According to an embodiment, enrolling users in ID token services and generating ID tokens for use during transactions as described herein may be accomplished by software, hardware, and/or firmware.

Computer executable instructions may be provided using any computer-readable media that are accessible by the computing apparatus 1018. Computer-readable media may include, for example, computer storage media such as a memory 1022 and communications media. Computer storage media, such as a memory 1022, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that the storage may be distributed or located remotely and accessed via a network or other communication link (e.g. using a communication interface 1023).

The computing apparatus 1018 may comprise an input/output controller 1024 configured to output information to one or more output devices 1025, for example a display or a speaker, which may be separate from or integral to the electronic device. The input/output controller 1024 may also be configured to receive and process an input from one or more input devices 1026, for example, a keyboard, a microphone or a touchpad. In one embodiment, the output device 1025 may also act as the input device. An example of such a device may be a touch sensitive display. The input/output controller 1024 may also output data to devices other than the output device, e.g. a locally connected printing device. In some embodiments, a user may provide input to the input device(s) 1026 and/or receive output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for enabling authentication of a user's identity based on a user identification (ID) token comprises: at least one processor of an identity platform; and at least one memory of the identity platform comprising computer program code, the at least one memory and the computer program code configured to, with the at least one processor, cause the at least one processor to: receive an enrollment request from a computing device of the user, the enrollment request including face image data, face liveness data, and payment account data associated with a payment account of the user; generate a face identification template of the user based on the face image data and the face liveness data, the face identification template configured to enable verification of the user's identity using captured image data of a face of the user; based on verifying the user's identity using data in the enrollment request, generate an ID token including the face identification template and the payment account data, wherein the ID token is configured to link the payment account with the face identification template; and provide the ID token to the computing device of the user, wherein the computing device is enabled to verify the user's identity based on comparison of the captured image data of the face of the user to the face identification template of the ID token during transactions associated with the computing device.

A computerized method for enabling authentication of a user's identity based on a user identification (ID) token comprises: receiving, by an identity platform, an enrollment request from a computing device of the user, the enrollment request including face image data, face liveness data, and payment account data associated with a payment account of the user; generating, by the identity platform, a face identification template of the user based on the face image data and the face liveness data, the face identification template configured to enable verification of the user's identity using captured image data of a face of the user; based on verifying the user's identity using data in the enrollment request, generating, by the identity platform, an ID token including the face identification template and the payment account data, wherein the ID token is configured to link the payment account with the face identification template; and providing, by the identity platform, the ID token to the computing device of the user, wherein the computing device is enabled to verify the user's identity based on comparison of the captured image data of the face of the user to the face identification template of the ID token during transactions associated with the computing device.

One or more non-transitory computer storage media having computer-executable instructions for enabling authentication of a user's identity based on a user identification (ID) token that, upon execution by a processor, cause the processor to at least: receive an enrollment request from a computing device of the user, the enrollment request including face image data, face liveness data, and payment account data associated with a payment account of the user; generate a face identification template of the user based on the face image data and the face liveness data, the face identification template configured to enable verification of the user's identity using captured image data of a face of the user; based on verifying the user's identity using data in the enrollment request, generate an ID token including the face identification template and the payment account data, wherein the ID token is configured to link the payment account with the face identification template; and provide the ID token to the computing device of the user, wherein the computing device is enabled to verify the user's identity based on comparison of the captured image data of the face of the user to the face identification template of the ID token during transactions associated with the computing device.

Alternatively, or in addition to the other examples described herein, examples include any combination of the following:

- further comprising: receiving, by the identity platform, a validation request associated with a payment request of an electronic transaction from the computing device of the user, the validation request including the ID token; based on validating the ID token in the validation request, sending, by the identity platform, a face data request to the computing device of the user, the face data request including instructions for capturing at least one of face image data or face liveness data of the user using the computing device; receiving, by the identity platform, a face data response from the computing device of the user, the face data response including at least one of face image data or face liveness data; generating, by the identity platform, a current face identification template of the face data response; and verifying, by the identity platform, the current face identification template of the face data response based on a comparison of the current face identification template with the face identification template included in the ID token; and providing, by the identity platform, a verification result to an associated payment network based on verifying the current face identification template, whereby the payment network is enabled to authenticate the user's identity based on the verification result and proceed with the electronic transaction.
- further comprising: receiving, by the identity platform, a second validation request associated with a second payment request of a second electronic transaction from the computing device of the user, the second validation request including the ID token, wherein the second electronic transaction is associated with a different merchant than the previous electronic transaction; sending, by the identity platform, a second face data request to the computing device of the user; receiving, by the identity platform, a second face data response from the computing device of the user, the second face data response including at least one of face image data or face liveness data; generating, by the identity platform, a face identification template of the second face data response; and verifying, by the identity platform, the face identification template of the second face data response based on a comparison of the face identification template of the second face data response with the face identification template included in the ID token; and providing, by the identity platform, a second verification result to the associated payment network based on verifying the face identification template of the second face data response.
- wherein generating the ID token includes encrypting at least a portion of the ID token based on the face identification template of the user; and wherein verifying the current face identification template of the face data response further includes decrypting at least a portion of the ID token based on the current face identification template of the face data response and confirming that the decrypted at least a portion of the ID token is intact.
- wherein the enrollment request further includes user identification data, the user identification data including at least one of a user name, a user address, a user telephone number, or a user email address; wherein verifying the user's identity using data in the enrollment request further includes verifying the user's identity based on the user identification data using one or more user identification data sources; and wherein the ID token is generated based on verification of the user's identity based on the user identification data.
- wherein the user identification data further includes identification data from at least one user identification document; wherein verifying the user's identity based on the user identification data further includes sending a verification request including at least the identification data from the at least one user identification document to an external identity verification provider; and wherein verifying the user's identity based on the user identification data is based on a verification response received from the external identity verification provider.
- wherein the enrollment request is associated with a payment request of an electronic transaction, wherein the payment request includes a defined payment amount; and wherein verifying the user's identity based on the user identification data using one or more user identification data sources includes: determining a subset of verification policy rules to apply to the user identification data from a set of verification policy rules based on applying at least one payment amount rule to the defined payment amount of the payment request; and verifying the user's identity based on applying the subset of verification policy rules to the user identification data, wherein the subset of verification policy rules are configured to verify the user's identity based on a subset of data values of the user identification data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving, by an identity platform, an enrollment request from a computing device of the user, the enrollment request including face image data, face liveness data, and payment account data associated with a payment account of the user; exemplary means for generating, by the identity platform, a face identification template of the user based on the face image data and the face liveness data, the face identification template configured to enable verification of the user's identity using captured image data of a face of the user; based on verifying the user's identity using data in the enrollment request, exemplary means for generating, by the identity platform, an ID token including the face identification template and the payment account data, wherein the ID token is configured to link the payment account with the face identification template; and exemplary means for providing, by the identity platform, the ID token to the computing device of the user, wherein the computing device is enabled to verify the user's identity based on comparison of the captured image data of the face of the user to the face identification template of the ID token during transactions associated with the computing device.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one processor of an identity platform; and
   at least one memory of the identity platform comprising computer program code, the computer program code causing the at least one processor to:
   receive, by a payment network server, an enrollment request from a computing device of a user, the enrollment request including face image data, face liveness data, and payment account data associated with a payment account of the user, wherein the face liveness data includes a face movement of the user;
   generate, by the payment network server, a face identification template of the user using the face image data and the face liveness data;
   verify an identity of the user using data in the enrollment request including using the face image data and the face liveness data, and generate, based on the verifying of the identity of the user, by the payment network server, an identification (ID) token that includes the face identification template and the payment account data;
   provide, by the payment network server, the ID token to the computing device of the user; and
   cause the computing device to verify the user's identity based on a comparison of captured image data of a face of the user to the face identification template of the ID token during transactions associated with the computing device.

2. The system of claim 1, wherein the computer program code further causes the processor to:
   receive a validation request associated with a payment request of a first electronic transaction from the computing device of the user, the validation request including the ID token;
   based on validating the ID token in the validation request, send a face data request to the computing device of the user, the face data request including instructions for capturing at least one of second face image data or second face liveness data of the user using the computing device;

receive a face data response from the computing device of the user, the face data response including at least one of the second face image data or the second face liveness data;

generate a current face identification template of the face data response;

verify the current face identification template of the face data response based on a comparison of the current face identification template with the face identification template included in the ID token; and provide a verification result to the payment network server based on verifying the current face identification template, whereby the payment network server authenticates the user's identity based on the verification result and proceeds with the first electronic transaction.

3. The system of claim 2, wherein the computer program code further causes the processor to:

receive, by the identity platform, a second validation request associated with a second payment request of a second electronic transaction from the computing device of the user, the second validation request including the ID token, wherein the second electronic transaction is associated with a different merchant than the first electronic transaction;

send, by the identity platform, a second face data request to the computing device of the user;

receive, by the identity platform, a second face data response from the computing device of the user, the second face data response including at least one of third face image data or third face liveness data;

generate, by the identity platform, a face identification template of the second face data response;

verify, by the identity platform, the face identification template of the second face data response based on a comparison of the face identification template of the second face data response with the face identification template included in the ID token; and provide, by the identity platform, a second verification result to the payment network server based on verifying the face identification template of the second face data response.

4. The system of claim 1, wherein the face movement includes one or more of: a blink, an eye movement, and a facial muscle movement.

5. The system of claim 1, wherein the enrollment request further includes user identification data, the user identification data including at least one of a user name, a user address, a user telephone number, or a user email address;

wherein verifying the user's identity using data in the enrollment request further includes verifying the user's identity based on the user identification data using one or more user identification data sources; and wherein the ID token is generated based on verification of the user's identity based on the user identification data.

6. The system of claim 5, wherein the user identification data further includes identification data from at least one user identification document;

wherein verifying the user's identity based on the user identification data further includes sending a verification request including at least the identification data from the at least one user identification document to an external identity verification provider; and wherein verifying the user's identity based on the user identification data is based on a verification response received from the external identity verification provider.

7. The system of claim 5, wherein the enrollment request is associated with a payment request of an electronic transaction, wherein the payment request includes a defined payment amount; and wherein verifying the user's identity based on the user identification data using one or more user identification data sources includes:

determining a subset of verification policy rules to apply to the user identification data from a set of verification policy rules based on applying at least one payment amount rule to the defined payment amount of the payment request; and verifying the user's identity based on applying the subset of verification policy rules to the user identification data, wherein the subset of verification policy rules is used to verify the user's identity based on a subset of data values of the user identification data.

8. A computerized method comprising:

receiving, by a payment network server, an enrollment request from a computing device of a user, the enrollment request including face image data, face liveness data, and payment account data associated with a payment account of the user, wherein the face liveness data includes a face movement of the user;

generating, by the payment network server, a face identification template of the user using the face image data and the face liveness data;

verifying an identity of the user using data in the enrollment request including using the face image data and the face liveness data, and, generating, based on the verifying of the identity of the user, by the payment network server, an identification (ID) token that includes the face identification template and the payment account data;

providing, by the payment network server, the ID token to the computing device of the user; and causing the computing device to verify the user's identity based on a comparison of captured image data of a face of the user to the face identification template of the ID token during transactions associated with the computing device.

9. The computerized method of claim 8, the method further comprising:

receiving, by the payment network server, a validation request associated with a payment request of a first electronic transaction from the computing device of the user, the validation request including the ID token;

based on validating the ID token in the validation request, sending, by the payment network server, a face data request to the computing device of the user, the face data request including instructions for capturing at least one of second face image data or second face liveness data of the user using the computing device;

receiving, by the payment network server, a face data response from the computing device of the user, the face data response including at least one of the second face image data or the second face liveness data;

generating, by the payment network server, a current face identification template of the face data response;

verifying, by the payment network server, the current face identification template of the face data response based on a comparison of the current face identification template with the face identification template included in the ID token; and providing, by the payment network server, a verification result based on verifying the current face identification template, whereby the payment network server authenticates the user's identity based on the verification result and proceeds with the first electronic transaction.

10. The computerized method of claim 9, the method further comprising:
receiving, by the payment network server, a second validation request associated with a second payment request of a second electronic transaction from the computing device of the user, the second validation request including the ID token, wherein the second electronic transaction is associated with a different merchant than the first electronic transaction;
sending, by the payment network server, a second face data request to the computing device of the user;
receiving, by the payment network server, a second face data response from the computing device of the user, the second face data response including at least one of third face image data or third face liveness data;
generating, by the payment network server, a face identification template of the second face data response;
verifying, by the payment network server, the face identification template of the second face data response based on a comparison of the face identification template of the second face data response with the face identification template included in the ID token; and
providing, by the payment network server, a second verification result based on verifying the face identification template of the second face data response.

11. The computerized method of claim 9, wherein generating the ID token includes encrypting at least a portion of the ID token based on the face identification template of the user; and
wherein verifying the current face identification template of the face data response further includes decrypting at least a portion of the ID token based on the current face identification template of the face data response and confirming that the decrypted at least a portion of the ID token is intact.

12. The computerized method of claim 8, wherein the enrollment request further includes user identification data, the user identification data including at least one of a user name, a user address, a user telephone number, or a user email address;
wherein verifying the user's identity using data in the enrollment request further includes verifying the user's identity based on the user identification data using one or more user identification data sources; and
wherein the ID token is generated based on verification of the user's identity based on the user identification data.

13. The computerized method of claim 12, wherein the user identification data further includes identification data from at least one user identification document;
wherein verifying the user's identity based on the user identification data further includes sending a verification request including at least the identification data from the at least one user identification document to an external identity verification provider; and
wherein verifying the user's identity based on the user identification data is based on a verification response received from the external identity verification provider.

14. The computerized method of claim 12, wherein the enrollment request is associated with a payment request of an electronic transaction, wherein the payment request includes a defined payment amount; and
wherein verifying the user's identity based on the user identification data using one or more user identification data sources includes:
determining a subset of verification policy rules to apply to the user identification data from a set of verification policy rules based on applying at least one payment amount rule to the defined payment amount of the payment request; and
verifying the user's identity based on applying the subset of verification policy rules to the user identification data, wherein the subset of verification policy rules is used to verify the user's identity based on a subset of data values of the user identification data.

15. One or more non-transitory computer storage media having computer-executable instructions that, upon execution by a processor, cause the processor to at least:
receive, by a payment network server, an enrollment request from a computing device of a user, the enrollment request including face image data, face liveness data, and payment account data associated with a payment account of the user, wherein the face liveness data includes a face movement of the user;
generate, by the payment network server, a face identification template of the user using the face image data and the face liveness data;
verify an identify of the user using data in the enrollment request including using the face image data and the face liveness data, and, generate, based on the verifying of the identity of the user, by the payment network server, an identification (ID) token that includes the face identification template and the payment account data;
provide, by the payment network server, the ID token to the computing device of the user; and
cause the computing device to verify the user's identity based on a comparison of captured image data of a face of the user to the face identification template of the ID token during transactions associated with the computing device.

16. The one or more non-transitory computer storage media of claim 15, wherein the computer-executable instructions, upon execution by a processor, further cause the processor to at least:
receive a validation request associated with a payment request of a first electronic transaction from the computing device of the user, the validation request including the ID token;
based on validating the ID token in the validation request, send a face data request to the computing device of the user, the face data request including instructions for capturing at least one of second face image data or second face liveness data of the user using the computing device;
receive a face data response from the computing device of the user, the face data response including at least one of the second face image data or the second face liveness data;
generate a current face identification template of the face data response;
verify the current face identification template of the face data response based on a comparison of the current face identification template with the face identification template included in the ID token; and
provide a verification result to the payment network server based on verifying the current face identification template, whereby the payment network server authenticates the user's identity based on the verification result and proceeds with the first electronic transaction.

17. The one or more non-transitory computer storage media of claim 16, wherein generating the ID token includes encrypting at least a portion of the ID token based on the face identification template of the user; and wherein verifying the current face identification template of the face data response further includes decrypting at least a portion of the ID token based on the current face identification template of the face data response and confirming that the decrypted at least a portion of the ID token is intact.

18. The one or more non-transitory computer storage media of claim 15, wherein the enrollment request further includes user identification data, the user identification data including at least one of a user name, a user address, a user telephone number, or a user email address;

wherein verifying the user's identity using data in the enrollment request further includes verifying the user's identity based on the user identification data using one or more user identification data sources; and wherein the ID token is generated based on verification of the user's identity based on the user identification data.

19. The one or more non-transitory computer storage media of claim 18, wherein the user identification data further includes identification data from at least one user identification document;

wherein verifying the user's identity based on the user identification data further includes sending a verification request including at least the identification data from the at least one user identification document to an external identity verification provider; and wherein verifying the user's identity based on the user identification data is based on a verification response received from the external identity verification provider.

20. The one or more non-transitory computer storage media of claim 18, wherein the enrollment request is associated with a payment request of an electronic transaction, wherein the payment request includes a defined payment amount; and wherein verifying the user's identity based on the user identification data using one or more user identification data sources includes:

determining a subset of verification policy rules to apply to the user identification data from a set of verification policy rules based on applying at least one payment amount rule to the defined payment amount of the payment request; and verifying the user's identity based on applying the subset of verification policy rules to the user identification data, wherein the subset of verification policy rules is used to verify the user's identity based on a subset of data values of the user identification data.

\* \* \* \* \*